United States Patent
Satoh et al.

(10) Patent No.: US 11,731,241 B2
(45) Date of Patent: Aug. 22, 2023

(54) SUBSTRATE ROTATION DEVICE, SUBSTRATE CLEANING DEVICE, SUBSTRATE PROCESSING DEVICE, AND CONTROL METHOD FOR SUBSTRATE ROTATION DEVICE

(71) Applicant: Ebara Corporation, Tokyo (JP)

(72) Inventors: Ichiju Satoh, Tokyo (JP); Toshimitsu Barada, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 1049 days.

(21) Appl. No.: 16/535,325

(22) Filed: Aug. 8, 2019

(65) Prior Publication Data

US 2020/0047310 A1     Feb. 13, 2020

(30) Foreign Application Priority Data

Aug. 10, 2018   (JP) .................................. 2018-151378

(51) Int. Cl.
*B24B 53/017*       (2012.01)
*F16C 32/04*        (2006.01)
(Continued)

(52) U.S. Cl.
CPC .......... *B24B 53/017* (2013.01); *B24B 37/005* (2013.01); *B24B 37/10* (2013.01); *F16C 32/044* (2013.01)

(58) Field of Classification Search
CPC ......... H01L 21/68785; H01L 21/68735; H01L 21/68728; H01L 21/683; B24B 7/182; B24B 7/184; B24B 55/04; B24B 55/05; B24B 55/052; B24B 55/06; B24B 55/10; B24B 55/102
See application file for complete search history.

(56) References Cited

U.S. PATENT DOCUMENTS 5,871,588 A * 2/1999 Moslehi ............... C23C 16/4584
                                                    156/345.55
5,916,366 A * 6/1999 Ueyama ............... H01L 21/6715
                                                         118/503
(Continued)

FOREIGN PATENT DOCUMENTS

JP       H0494537 A       3/1992
JP       H07169732 A      7/1995
(Continued)

*Primary Examiner* — Joel D Crandall
(74) *Attorney, Agent, or Firm* — Venjuris, P.C.

(57) ABSTRACT

An advanced substrate rotation device is provided. A substrate rotation device is disclosed. The substrate rotation device includes an outer cylinder, an inner cylinder positioned inside the outer cylinder, a motor for rotating the inner cylinder, a magnetic bearing for magnetically levitating the inner cylinder, and a substrate holder disposed on the inner cylinder. The motor is a radial motor including a motor stator mounted on the outer cylinder, and a motor rotor mounted on the inner cylinder. The magnetic bearing is a radial magnetic bearing including a magnetic bearing stator mounted on the outer cylinder, and a magnetic bearing rotor mounted on the inner cylinder. The magnetic bearing is configured to magnetically levitate the inner cylinder with an attractive force between the magnetic bearing stator and the magnetic bearing rotor.

12 Claims, 7 Drawing Sheets

(51) Int. Cl.
*B24B 37/10* (2012.01)
*B24B 37/005* (2012.01)

(56) References Cited

U.S. PATENT DOCUMENTS

| | | | |
|---|---|---|---|
| 6,213,855 B1 * | 4/2001 | Natalicio | B24B 37/107 |
| | | | 451/364 |
| 2003/0107282 A1 | 1/2003 | Ooyama et al. | |
| 2010/0130020 A1 * | 5/2010 | Kim | H01L 21/68728 |
| | | | 156/345.23 |
| 2016/0096205 A1 * | 4/2016 | Kato | H01L 21/68728 |
| | | | 134/21 |
| 2016/0236239 A1 * | 8/2016 | Nishiyama | H01L 21/67046 |
| 2017/0243735 A1 * | 8/2017 | Kaba | H01L 21/67 |

FOREIGN PATENT DOCUMENTS

| | | | |
|---|---|---|---|
| JP | 2004342939 A | * | 12/2004 |
| JP | 2018-006368 A | | 1/2018 |

* cited by examiner

SUBSTRATE ROTATION DEVICE, SUBSTRATE CLEANING DEVICE, SUBSTRATE PROCESSING DEVICE, AND CONTROL METHOD FOR SUBSTRATE ROTATION DEVICE

CROSS-REFERENCE TO RELATED APPLICATIONS

This application is based upon and claims the benefit of priority of the prior Japanese Patent Application No. 2018-151378, filed on Aug. 10, 2018, the entire content of which is incorporated herein by reference.

TECHNICAL FIELD

The present invention relates to a substrate rotation device, a substrate cleaning device, a substrate processing device, and a control method for the substrate rotation device.

BACKGROUND

Conventionally, a substrate rotation device for rotating a substrate has been known. Typically, any other device includes the substrate rotation device. For example, Japanese Unexamined Patent Application Publication No. 2018-006368 discloses a substrate cleaning device including a substrate rotation device.

SUMMARY

One object of this application is to provide a substrate rotation device.

This application discloses a substrate rotation device as one embodiment. The substrate rotation device includes an outer cylinder, an inner cylinder positioned inside the outer cylinder, a motor that rotates the inner cylinder, a magnetic bearing that magnetically levitates the inner cylinder, and a substrate holder disposed on the inner cylinder. The motor is a radial motor including a motor stator mounted on the outer cylinder, and a motor rotor mounted on the inner cylinder. The magnetic bearing is a radial magnetic bearing including a magnetic bearing stator mounted on the outer cylinder, and a magnetic bearing rotor mounted on the inner cylinder. The magnetic bearing is configured to magnetically levitate the inner cylinder with an attractive force between the magnetic bearing stator and the magnetic bearing rotor.

DETAILED DESCRIPTION

Figure 1:
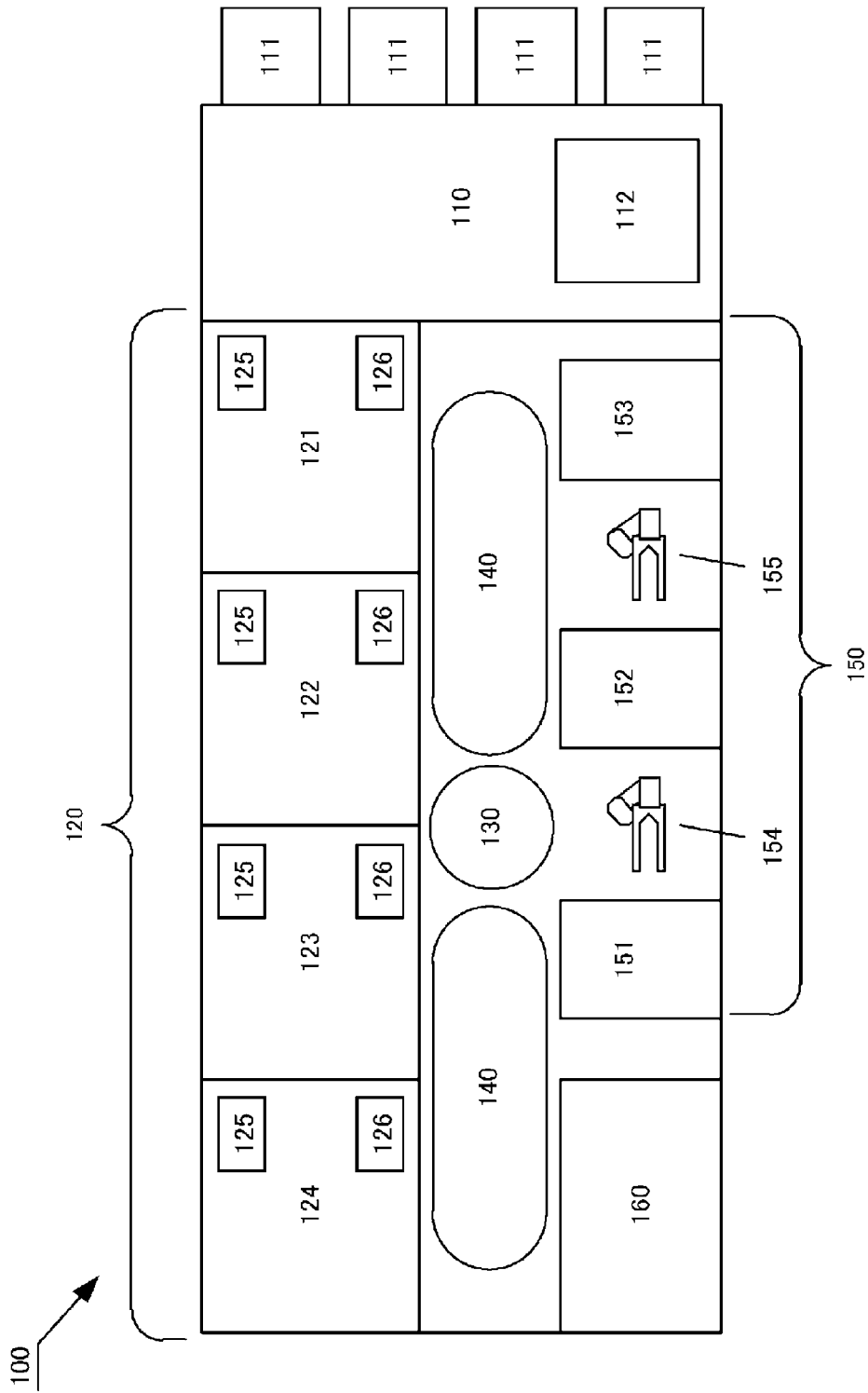
FIG. 1 is a top view schematically illustrating a substrate processing device.

The following describes a substrate rotation device and a device including this substrate rotation device according to an embodiment by referring to the drawings. In the following example, a substrate cleaning device includes the substrate rotation device. Furthermore, in the following example, a substrate processing device includes the substrate cleaning device. However, note that it is possible to employ a configuration other than the exemplified configuration. The substrate rotation device according to the embodiment may be applied to a device other than the substrate cleaning device. The substrate cleaning device according to the embodiment may be applied to a device other than the substrate processing device.

FIG. 1 is a top view schematically illustrating a substrate processing device 100. The substrate processing device 100 in FIG. 1 includes a loading/unloading unit 110, a polishing unit 120, and a wafer station 130. The substrate processing device 100 further includes a substrate conveyance unit 140 and a substrate cleaning unit 150. In addition, the substrate processing device 100 includes a control unit 160.

The loading/unloading unit 110 is disposed to load a substrate necessary to be processed from an outside of the substrate processing device 100 and to unload a substrate whose process has been ended from an inside of the substrate processing device 100. The substrate may be a silicon wafer or may be another type of substrate. The loading/unloading unit 110 includes at least one (in the example in the drawing, four) FOUP 111 and a conveyance robot 112 for the loading/unloading unit. The FOUP 111 is configured to house the substrate or a substrate cassette housing the substrate. The conveyance robot 112 for the loading/unloading unit receives/delivers the substrate from/to the desired FOUP 111. The substrate received by the conveyance robot 112 for the loading/unloading unit may be sent to the polishing unit 120 by, for example, the substrate conveyance unit 140, which is described later, and/or a mechanism (not illustrated).

The polishing unit 120 in the example in FIG. 1 includes a first polishing device 121, a second polishing device 122, a third polishing device 123, and a fourth polishing device 124. Here, terms such as "first" and "second" used for describing the polishing device are merely terms for distinguishing the respective polishing devices. In other words, the terms such as "first" and "second" used for describing the polishing device may be unrelated to, for example, an order and/or a priority of polishing or may be related to, for example, the order and/or the priority of the polishing.

Each of the first polishing device 121 to the fourth polishing device 124 is, for example, a CMP device. Each of the first polishing device 121 to the fourth polishing device 124 includes a polishing table (not illustrated) for mounting a polishing pad and a top ring (not illustrated) for mounting the substrate. However, each of the first polishing device 121 to the fourth polishing device 124 may be a CMP device having another configuration or may be a polishing device other than the CMP device. Each of the first polishing device 121 to the fourth polishing device 124 may include a liquid supply device (not illustrated) for supplying the polishing pad with a polishing liquid and the like. The liquid supply devices may be included separately in the respective first polishing device 121 to fourth polishing device 124. It may be configured such that one liquid supply device supplies a plurality of polishing devices with a liquid.

The polishing unit 120 may include an atomizer 125. The atomizer 125 is configured to atomize a fluid to spray it toward the polishing table of the CMP device. The fluid used by the atomizer 125 may be, for example, a pure water or may be, for example, a mixture of the pure water and nitrogen gas. The polishing pad is mounted on the polishing table. Thus, the sprayed fluid collides against the polishing pad. The sprayed fluid washes away polishing wastes, abrasive grains, and the like on the polishing pad. Briefly speaking, the atomizer 125 is configured to clean the polishing pad. Additionally or alternatively, a polishing-pad cleaning mechanism other than the atomizer 125 may be used.

The polishing unit 120 may further include a dresser 126. Depending on materials, shapes, properties of surfaces, and the like of the polishing pad and the polished substrate, the polishing wastes, which are generated during the polishing of the substrate, may reduce a performance of the polishing pad. Especially when fine holes are provided on the surface of polishing pad, the holes may get clogged with the polishing wastes. A polishing rate and a flatness and/or a uniformity of the polishing of the clogged polishing pad may reduce compared with those of an ordinary polishing pad. Accordingly, it is necessary to regenerate the polishing pad to keep the performance of the polishing pad at an appropriate performance. A typical dresser 126 is configured to be able to contact the polishing pad on the polishing table. The dresser 126 contacts the polishing pad to shave the surface of the polishing pad. The polishing wastes and the like on the surface are removed to recover the function of the polishing pad. The dresser 126 can be described as a member to dress the polishing pad. The dresser 126 may have a function to shave protrusions of a deformed polishing pad to improve the flatness of the polishing pad itself. A representative dresser 126 contains, for example, diamond abrasive grains. A non-contact type dresser 126 using ultrasonic sound wave or water flow is also known.

When the dresser 126, especially a contact type dresser 126 dresses the polishing pad, foreign matters may be generated on the surface of the polishing pad. Therefore, preferably, cleaning of the polishing pad by the atomizer 125 is performed after the dressing of the polishing pad by the dresser 126. Each of the first polishing device 121, the second polishing device 122, the third polishing device 123, and the fourth polishing device 124 may include the atomizer 125 and the dresser 126 individually. The atomizer 125 and/or the dresser 126 may be shared by a plurality of polishing devices. The atomizer 125 and/or the dresser 126 may be configured to be able to be stored. The atomizer 125 and/or the dresser 126 that can be stored do not inhibit the polishing of the substrate by the polishing device and conveyance of the substrate by the substrate conveyance unit 140 and the like. Any specific properties including configurations and a layout of the atomizer 125 and/or the dresser 126 may be determined by a person skilled in the art as necessary. In the example in FIG. 1, the polishing unit 120 includes the atomizer 125 and the dresser 126. However, the atomizer 125 and/or the dresser 126 may be a component independent from the polishing unit 120. Furthermore, the atomizer 125 and/or the dresser 126 may be a component independent from the substrate processing device 100. The atomizer 125 and the dresser 126 may be activated while each polishing device does not polish the substrate, for example, in a standby time of the substrate processing device 100 or the polishing unit 120.

The substrate polished by the polishing unit 120 is conveyed to the wafer station 130 by the substrate conveyance unit 140. The wafer station 130 is configured to be able to hold the substrate after the polishing and before cleaning. The wafer station 130 may be able to hold one substrate or may be able to hold two or more substrates.

The substrate held onto the wafer station 130 is conveyed to the substrate cleaning unit 150 (more specifically, a first substrate cleaning device 151, which is described later) by a first cleaning-unit conveyance robot 154, which is described later. The substrate cleaning unit 150 may include the first substrate cleaning device 151, a second substrate cleaning device 152, and a third substrate cleaning device 153. The substrate is cleaned multiple times from the first substrate cleaning device 151 to the third substrate cleaning device 153. The substrate cleaning unit 150 may further include the first cleaning-unit conveyance robot 154 and a second cleaning-unit conveyance robot 155.

The substrate conveyed to the substrate cleaning unit 150 is cleaned by the respective substrate cleaning devices (151, 152, and 153). Each substrate cleaning device, especially a device that is in charge of a final process of the cleaning (in the example in FIG. 1, the third substrate cleaning device 153) may have a function to dry the substrate. The drying of the substrate may be performed, for example, by rotating the substrate at high speed (spin-dry). Additionally or alternatively, an independent substrate drying device may be disposed separately from the substrate cleaning device. The number of the substrate cleaning devices is not limited to three. The number of the substrate cleaning devices may be one, may be two, or may be four or more. Depending on the number and/or a layout and the like of the substrate cleaning devices, the number and/or a layout and the like of cleaning-unit conveyance robots may be also changed.

The first cleaning-unit conveyance robot 154 receives the substrate after the polishing from the wafer station 130 to convey the received substrate to the first substrate cleaning device 151. The first cleaning-unit conveyance robot 154 receives the substrate cleaned by the first substrate cleaning device 151 to convey the received substrate to the second substrate cleaning device 152. The second cleaning-unit conveyance robot 155 receives the substrate cleaned by the second substrate cleaning device 152 to convey the received substrate to the third substrate cleaning device 153.

Figure 2:
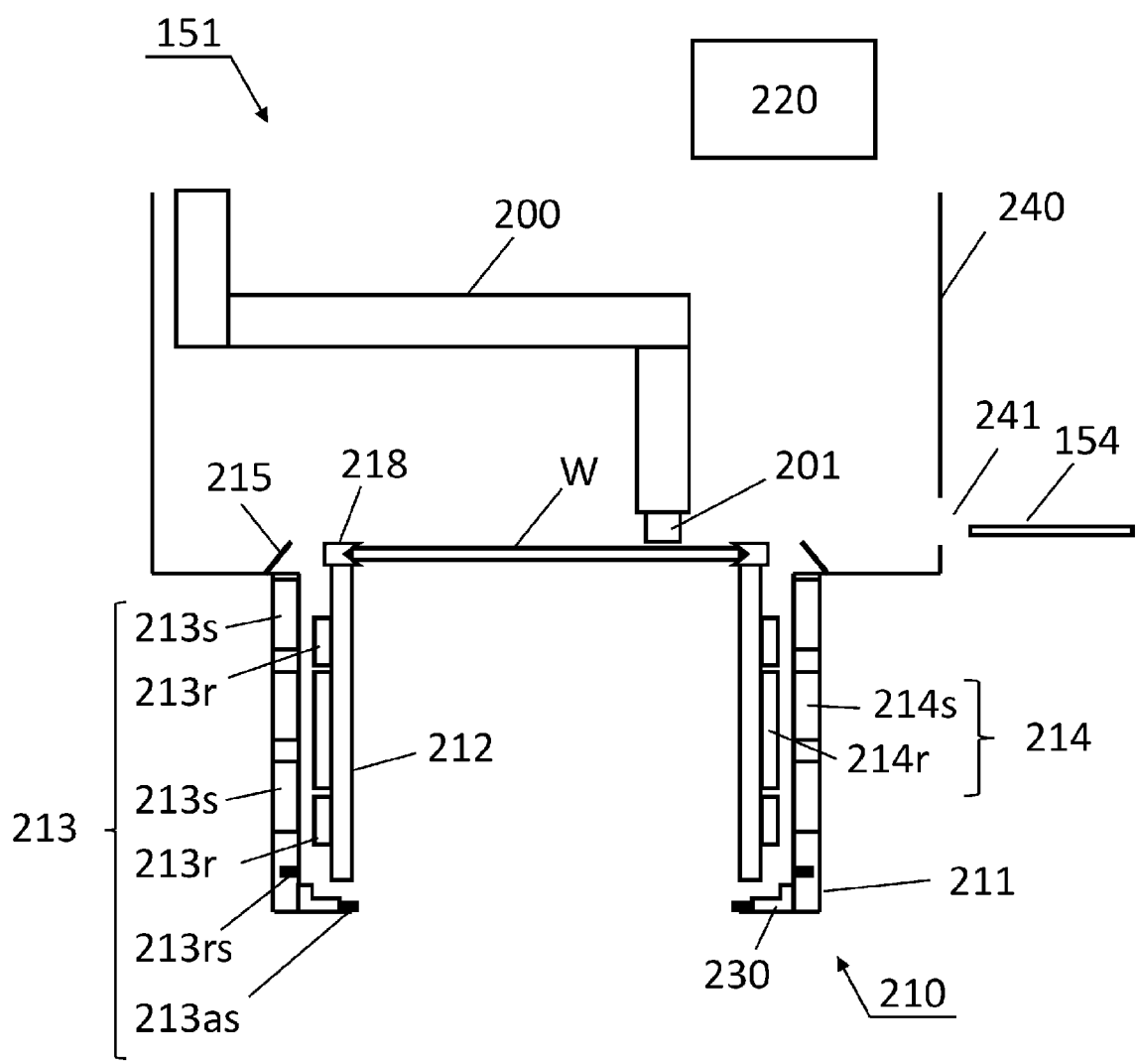
FIG. 2 is a front view schematically illustrating a substrate cleaning device and a view where an inner cylinder is positioned at a cleaning position.

FIG. 2 is a front view schematically illustrating the substrate cleaning device according to one embodiment. In FIG. 2, the first substrate cleaning device 151 is described as an example. The configurations of the second substrate cleaning device 152 and/or the third substrate cleaning device 153 may be configurations similar to the configuration illustrated in FIG. 2. FIG. 2 schematically illustrates the first cleaning-unit conveyance robot 154 (accurately, a conveyance arm of the first cleaning-unit conveyance robot 154) as well.

The first substrate cleaning device 151 includes a cleaning arm 200 and a substrate rotation device 210. The substrate rotation device 210 includes a control unit 220. Additionally or alternatively, the first substrate cleaning device 151 may include the control unit 220. Additionally or alternatively, the control unit 160 may control the first substrate cleaning device 151 and/or the substrate rotation device 210. The control unit 220 may be a part of the control unit 160, the control unit 220 may be configured to communicate with the control unit 160, or the control unit 220 may be an independent control unit separately from the control unit 160. The first substrate cleaning device 151 may further include a liquid supply mechanism (not illustrated) for supplying a liquid such as a cleaning liquid. Connection between the control unit and other components may be wireless connection or may be wired connection. In FIG. 2 and other drawings, illustration of a cable for communication may be omitted. The first substrate cleaning device 151 may include a cover 240 for the cleaning arm 200 and the substrate rotation device 210.

The cleaning arm 200 is configured to ensure an up-and-down motion, a horizontal movement, a pivotal movement, a swing, and the like. Furthermore, for conveyance of a substrate W, the cleaning arm 200 is configured to be retractable from above the substrate W. For example, a cleaning brush 201 is disposed on a distal end of the cleaning arm 200. The cleaning brush 201 may be made of, for example, PVA. However, a material and a shape of the cleaning brush 201 are not limited. A specific configuration of the cleaning brush 201 may be determined by the person skilled in the art as necessary. The substrate W is cleaned such that the substrate rotation device 210 rotates the substrate W in a state where the cleaning brush 201 is in contact with the substrate W. When the cleaning brush 201 cleans the substrate W, a cleaning liquid supply mechanism (not illustrated) may supply the cleaning brush 201 or the substrate W with the cleaning liquid. However, note that the configuration in FIG. 2 is merely an example. Specific configuration and method for cleaning the substrate W may be conventionally known any configuration and method. For example, the substrate W may be cleaned with the cleaning liquid injected toward the substrate W. The cleaning arm 200 may be controlled by the control unit 160 and/or the control unit 220.

The substrate rotation device 210 includes an outer cylinder 211 and an inner cylinder 212 positioned inside the outer cylinder 211. Preferably, the inner cylinder 212 is positioned movable up and down inside the outer cylinder 211. The substrate rotation device 210 further includes a magnetic bearing 213 for magnetically levitate the inner cylinder 212 and a motor 214 for rotating the inner cylinder 212. The magnetic bearing 213 is a radial magnetic bearing. The motor 214 is a radial motor.

Furthermore, the substrate rotation device 210 may include a touchdown mechanism 230. The touchdown mechanism 230 may be a bearing or may be a block made of Teflon (registered trademark) and the like. The touchdown mechanism 230 is a member to mechanically contact the inner cylinder 212 to receive the inner cylinder 212 when an operational failure has occurred on the magnetic bearing 213, for example, when a mechanical failure has occurred, when a power failure has occurred, or when a control error has occurred. Preferably, the touchdown mechanism 230 is configured to be able to support the inner cylinder 212 bidirectionally in a radial direction and an axial direction. For example, when the touchdown mechanism 230 is the bearing, use of an angular bearing ensures the bidirectional support. For example, when the touchdown mechanism 230 is the Teflon (registered trademark) block, forming the Teflon (registered trademark) block to have an L-shaped cross section ensures the bidirectional support. However, one touchdown mechanism 230 configured to support the inner cylinder 212 in the radial direction and another touchdown mechanism 230 configured to support the inner cylinder 212 in the axial direction may be each disposed. Depending on a configuration, a required specification, and the like of the substrate rotation device 210, a touchdown mechanism 230 configured to support the inner cylinder 212 in only any one of the radial direction and the axial direction may be used.

A part of the magnetic bearing 213 and a part of the motor 214 are mounted on the outer cylinder 211. Specifically, a magnetic bearing stator 213s of the magnetic bearing 213 and a motor stator 214s of the motor 214 are mounted on the outer cylinder 211. The first substrate cleaning device 151 may further include a splash guard 215. The splash guard 215 is disposed at the proximity of the substrate W on an upper surface of the outer cylinder 211. The splash guard 215 may be referred to as a "cup (see Japanese Unexamined Patent Application Publication No. 2018-006368)," a "fender," or a "wing." The splash guard 215 is configured to receive the liquid scattered from the substrate W and the like. Preferably, the splash guard 215 has an upper end positioned at a height identical to that of a substrate holder 218 or higher than the substrate holder 218. However, here, the height of the substrate holder 218 when the inner cylinder 212 is positioned at a cleaning position is defined as a comparison target (the detail of the cleaning position will be described later). Preferably, the splash guard 215 has a shape that is a ring shape obtained by cutting a conic surface having an inverse V-shaped cross section. The splash guard 215 having a preferable configuration can effectively receive the liquid scattered from the substrate W and the like. However, a specific configuration of the splash guard 215 is not limited to the exemplified configuration.

The cover 240 has an opening portion 241. This opening portion 241 allows the first cleaning-unit conveyance robot 154 to access to the substrate W on the substrate holder 218. The opening portion 241 may include a mechanism (not illustrated) such as a door or a shutter. In addition to or instead of the opening portion 241, another configuration for the first cleaning-unit conveyance robot 154 may be used depending on the configurations of the first substrate cleaning device 151 and the first cleaning-unit conveyance robot 154.

The inner cylinder 212 is a cylindrically-shaped member. FIG. 2 illustrates the hollow inner cylinder 212, while the inner cylinder 212 may be a solid cylinder. The inner cylinder 212 includes a magnetic bearing rotor 213r of the magnetic bearing 213, a motor rotor 214r of the motor 214, and the substrate holder 218 for holding the substrate W. The magnetic bearing rotor 213r and the motor rotor 214r are mounted on an outer surface of the inner cylinder 212. The substrate holder 218 is disposed on an upper end of the inner cylinder 212.

The substrate holder 218 in FIG. 2 is a chuck that holds an edge part of the substrate W with a mechanical engagement. However, a substrate holder 218 having a configuration other than the configuration illustrated in the drawing can be employed. A substrate holder 218 that holds a back surface, not the edge of the substrate W may be employed. As the substrate holder 218, a vacuum chuck or an electrostatic chuck may be used.

The magnetic bearing rotor 213r interacts with the magnetic bearing stator 213s to function as the magnetic bearing 213. The magnetic bearing 213 may magnetically levitate the inner cylinder 212. The motor rotor 214r interacts with the motor stator 214s to function as the motor 214. The configurations of the magnetic bearing 213 and the motor 214 may be conventionally known any configurations. For example, the magnetic bearing 213 may include a displacement sensor. For example, the magnetic bearing 213 may include at least one of a radial sensor 213rs and an axial sensor 213as. The radial sensor 213rs and/or the axial sensor 213as has a signal that may be output toward the control unit 160 and/or the control unit 220. The control unit 160 and/or the control unit 220 may perform a feedback control on the magnetic bearing 213 based on the received signal of the displacement sensor. The motor 214 may be a hysteresis motor, a reluctance motor, a synchronous reluctance motor, an induction motor, or the like.

The interaction between the magnetic bearing stator 213s and the magnetic bearing rotor 213r has a strength (a strength of an attractive force) that depends on at least a magnitude of a magnetic-flux density in a gap between the magnetic bearing stator 213s and the magnetic bearing rotor 213r. The magnitude of the magnetic-flux density in the gap is determined by a sum of a bias current of the magnetic bearing 213 and a control current of the magnetic bearing 213. "The bias current of the magnetic bearing 213" means a current flowing through electromagnets of the magnetic bearing stator 213s and/or the magnetic bearing rotor 213r (generally, means a current flowing through electromagnets of the magnetic bearing stator 213s). The bias current may linearize a force that the electromagnets of the magnetic bearing 213 provide/receive. Typically, the bias current is equally applied to all the electromagnets of the magnetic bearing stator 213s. "The control current of the magnetic bearing 213" means a current applied to (the electromagnets of) the magnetic bearing stator 213s to cancel a displacement (for example, a displacement by vibration) from an ideal position of the inner cylinder 212. The control current of the magnetic bearing 213 is superimposed on the bias current. The control current of the magnetic bearing 213 is selectively applied to necessary electromagnets among the electromagnets of the magnetic bearing stator 213s. The displacement of the inner cylinder 212 may be detected by the displacement sensor (the radial sensor 213rs, the axial sensor 213as). Accordingly, the control current has a magnitude that may be determined depending on a signal amount of the displacement sensor. As described above, the control current is merely a current applied as necessary. Thus, the strength of the attractive force between the magnetic bearing stator 213s and the magnetic bearing rotor 213r is mainly determined by the bias current of the magnetic bearing 213.

In FIG. 2, the magnetic bearing stator 213s is positioned above the magnetic bearing rotor 213r. Accordingly, the attractive force between the magnetic bearing stator 213s and the magnetic bearing rotor 213r in the case in FIG. 2 contains a component in a vertically up direction. Accordingly, the magnetic bearing 213 as the radial magnetic bearing is configured to magnetically levitate the inner cylinder 212 with the attractive force between the magnetic bearing stator 213s and the magnetic bearing rotor 213r. That is, to magnetically levitate the inner cylinder 212, the substrate rotation device 210 need not include an axial magnetic bearing. The substrate rotation device 210 is configured to rotate the inner cylinder 212, and as a result, rotate the substrate W in a state where the inner cylinder 212 is being magnetically levitated.

Furthermore, controlling the bias current of the magnetic bearing 213 can control a magnitude of a force in an up direction applied to the magnetic bearing 213. That is, controlling the bias current of the magnetic bearing 213 allows a position in an up-down direction of the inner cylinder 212 to be controlled. The inner cylinder 212 according to one embodiment is configured to move up and down between the cleaning position (FIG. 2) for cleaning the substrate W and a conveyance position (FIG. 3) that is a position higher than the cleaning position and a position for conveying the substrate W. When the substrate rotation device 210 is mounted on another device, not the substrate cleaning device, "the cleaning position" may be generalized as "a processing position." "The cleaning position" may be referred to as "a first position." "The conveyance position" may be referred to as "a second position." The inner cylinder 212 is being magnetically levitated at both positions of the cleaning position and the conveyance position. The inner cylinder 212 can be positioned below the cleaning position.

Figure 3:
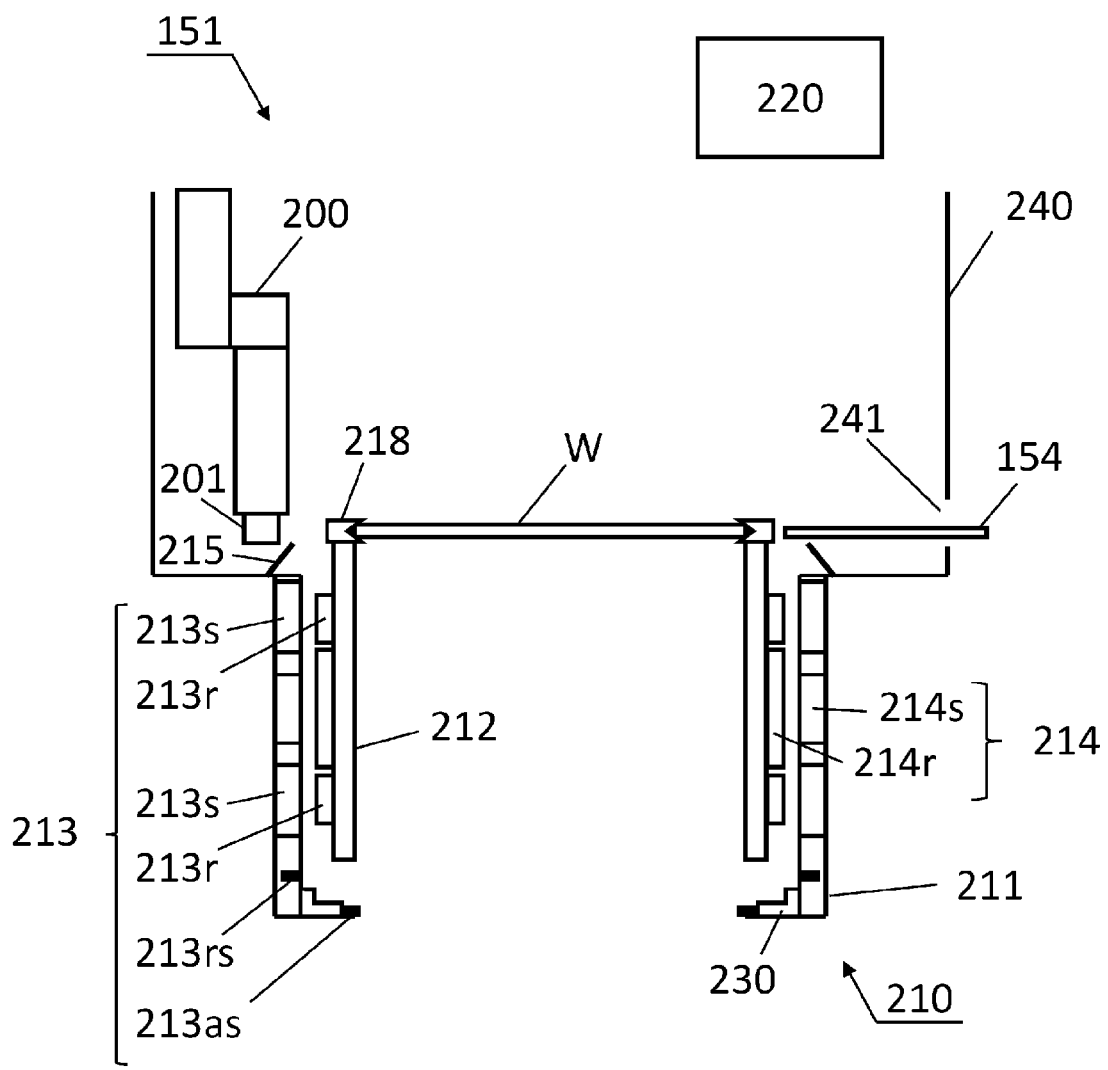
FIG. 3 is a front view schematically illustrating the substrate cleaning device and a view where the inner cylinder is positioned at a conveyance position.

FIG. 3 is a front view schematically illustrating the first substrate cleaning device 151 when the inner cylinder 212 is at the conveyance position. In FIG. 3, the cleaning arm 200 has been retracted from above the substrate W. To position the inner cylinder 212 from the cleaning position (see FIG. 2) to the conveyance position (see FIG. 3), the control unit 160 and/or the control unit 220 increases the bias current of the magnetic bearing 213. The increase in the bias current of the magnetic bearing 213 increases the attractive force between the magnetic bearing stator 213s and the magnetic bearing rotor 213r, thus raising the inner cylinder 212 as a result. After the inner cylinder 212 is positioned at the conveyance position, the bias current of the magnetic bearing 213 may remain increased. On the other hand, insofar as a current value in a range where the inner cylinder 212 can be stabilized at the conveyance position, the bias current of the magnetic bearing 213 may be decreased after the inner cylinder 212 is positioned at the conveyance position. After the inner cylinder 212 is once positioned at the conveyance position, the feedback control (especially, the feedback control on the height of the inner cylinder 212) may be performed on the magnetic bearing 213 based on the signal from the axial sensor 213as. The axial sensor 213as may detect whether the inner cylinder 212 is at the cleaning position, the conveyance position, or their intermediate position, and whether a movement of the inner cylinder 212 from the cleaning position to the conveyance position or a movement of the inner cylinder 212 from the conveyance position to the cleaning position has succeeded.

The inner cylinder 212 rises until the magnetic bearing rotor 213r is opposed to the magnetic bearing stator 213s at a maximum (see FIG. 3). This is because, under the condition where the magnetic bearing rotor 213r is opposed to the magnetic bearing stator 213s, the attractive force between the magnetic bearing stator 213s and the magnetic bearing rotor 213r is actually in the horizontal direction. The conveyance position in an actual device may be a position lower than the position illustrated in FIG. 3.

At the conveyance position, reception of the substrate W from the substrate holder 218 and delivery of the substrate W to the substrate holder 218, that is, the conveyance of the substrate W is performed. For the reception/delivery of the substrate W, the first cleaning-unit conveyance robot 154 is used. Positioning the inner cylinder 212 at the conveyance position increases the position of the substrate holder 218, thus facilitating the conveyance of the substrate W. Preferably, the first substrate cleaning device 151 is configured such that the substrate holder 218 is positioned at a height identical to the upper end of the splash guard 215 or lower than the upper end of the splash guard 215 when the inner cylinder 212 is at the cleaning position. Preferably, the first substrate cleaning device 151 is configured such that the substrate holder 218 is positioned higher than the upper end of the splash guard 215 when the inner cylinder 212 is at the conveyance position. Configuring the first substrate cleaning device 151 as described above allows the splash guard 215 to receive the liquid scattered from the substrate at the cleaning position and ensures more efficient conveyance of the substrate W at the conveyance position. In the example in FIG. 3, the substrate holder 218 is positioned higher than the upper end of the splash guard 215 when the inner cylinder 212 is at the conveyance position. Thus, the first cleaning-unit conveyance robot 154 does not collide with the splash guard 215 even when the first cleaning-unit conveyance robot 154 is moved toward the substrate W. Accordingly, in a preferable aspect, an additional up-and-down motion mechanism for conveying the substrate W is not required. However, it is not excluded to add the additional up-and-down motion mechanism in addition to the configuration of each embodiment.

After the conveyance of the substrate W is performed at the conveyance position, the control unit 160 and/or the control unit 220 reduces the bias current of the magnetic bearing 213 to move the inner cylinder 212 from the conveyance position to the cleaning position. The reduction in the bias current of the magnetic bearing 213 reduces the attractive force between the magnetic bearing stator 213s and the magnetic bearing rotor 213r, thus decreasing the inner cylinder 212 as a result. After the inner cylinder 212 is positioned at the cleaning position, the bias current of the magnetic bearing 213 may remain reduced (However, it is limited to a case where any stopper mechanism exists. The touchdown mechanism 230 may act as a stopper). On the other hand, insofar as the current value in a range where the inner cylinder 212 can be stabilized at the cleaning position, the bias current of the magnetic bearing 213 may be increased after the inner cylinder 212 is positioned at the cleaning position. After the inner cylinder 212 is once positioned at the cleaning position, the feedback control may be performed by the axial sensor 213as and the control unit 160 and/or the control unit 220.

Preferably, the motor rotor 214r has a length longer than a length of the motor stator 214s. Here, "the length" is a length along the up-down direction in FIG. 2. In other words, here, "the length" is a length along a rotation axis (axis) of the inner cylinder 212. More preferably, a difference between the length of the motor rotor 214r and the length of the motor stator 214s is larger than a distance between the conveyance position and the cleaning position of the inner cylinder 212. The motor rotor 214r has a length above a certain length to allow at least a part of the motor rotor 214r to be opposed to the motor stator 214s in both cases where the inner cylinder 212 is at the conveyance position and where the inner cylinder 212 is at the cleaning position. That is, making the motor rotor 214r have the length above a certain length facilitates operation of the motor 214 at both positions of the conveyance position and the cleaning position.

Figure 4:
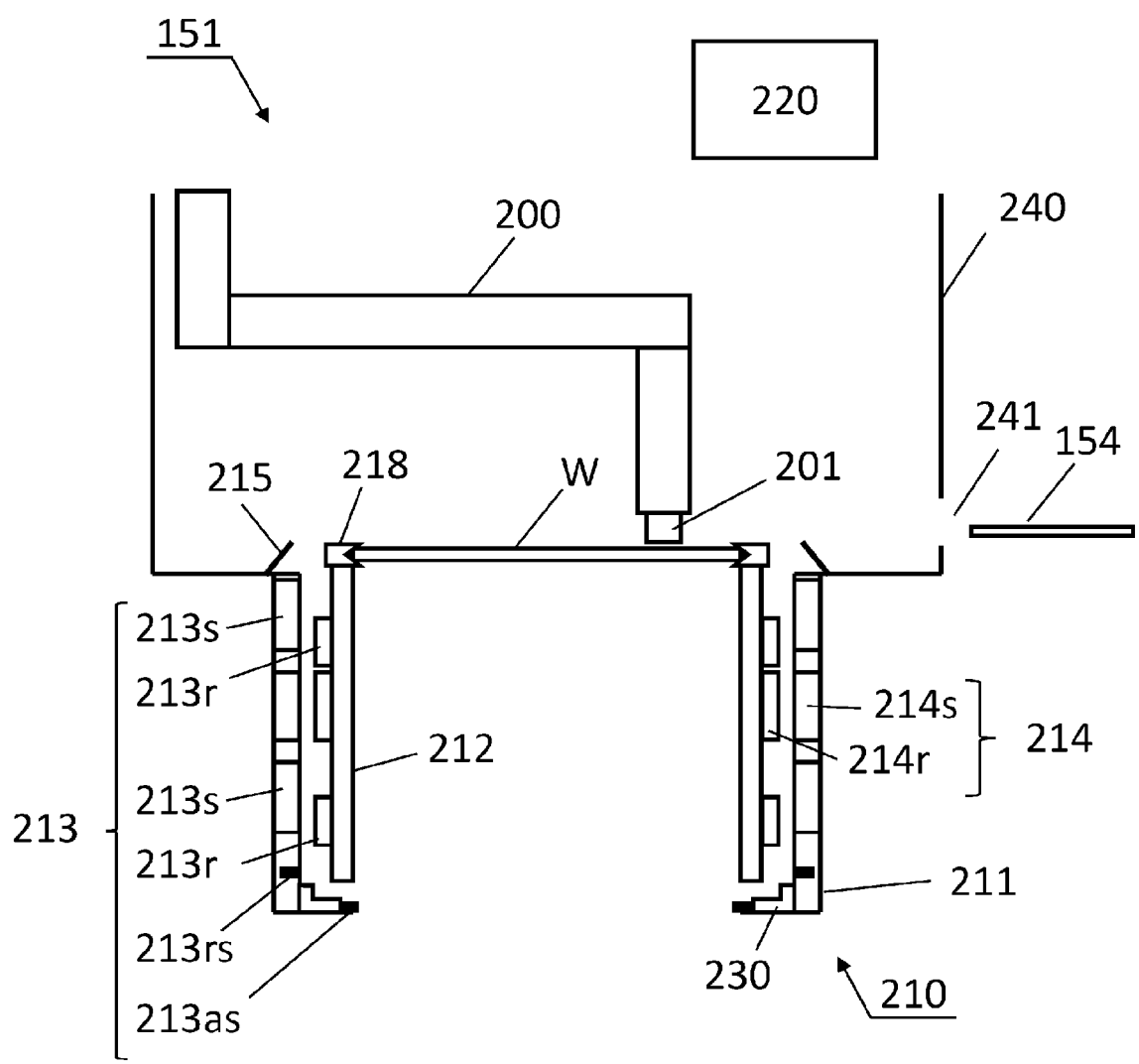
FIG. 4 is a front view schematically illustrating a substrate rotation device including a motor rotor having a length identical to that of a motor stator and a substrate cleaning device including this substrate rotation device and a view where the inner cylinder is positioned at the cleaning position.
Figure 5:
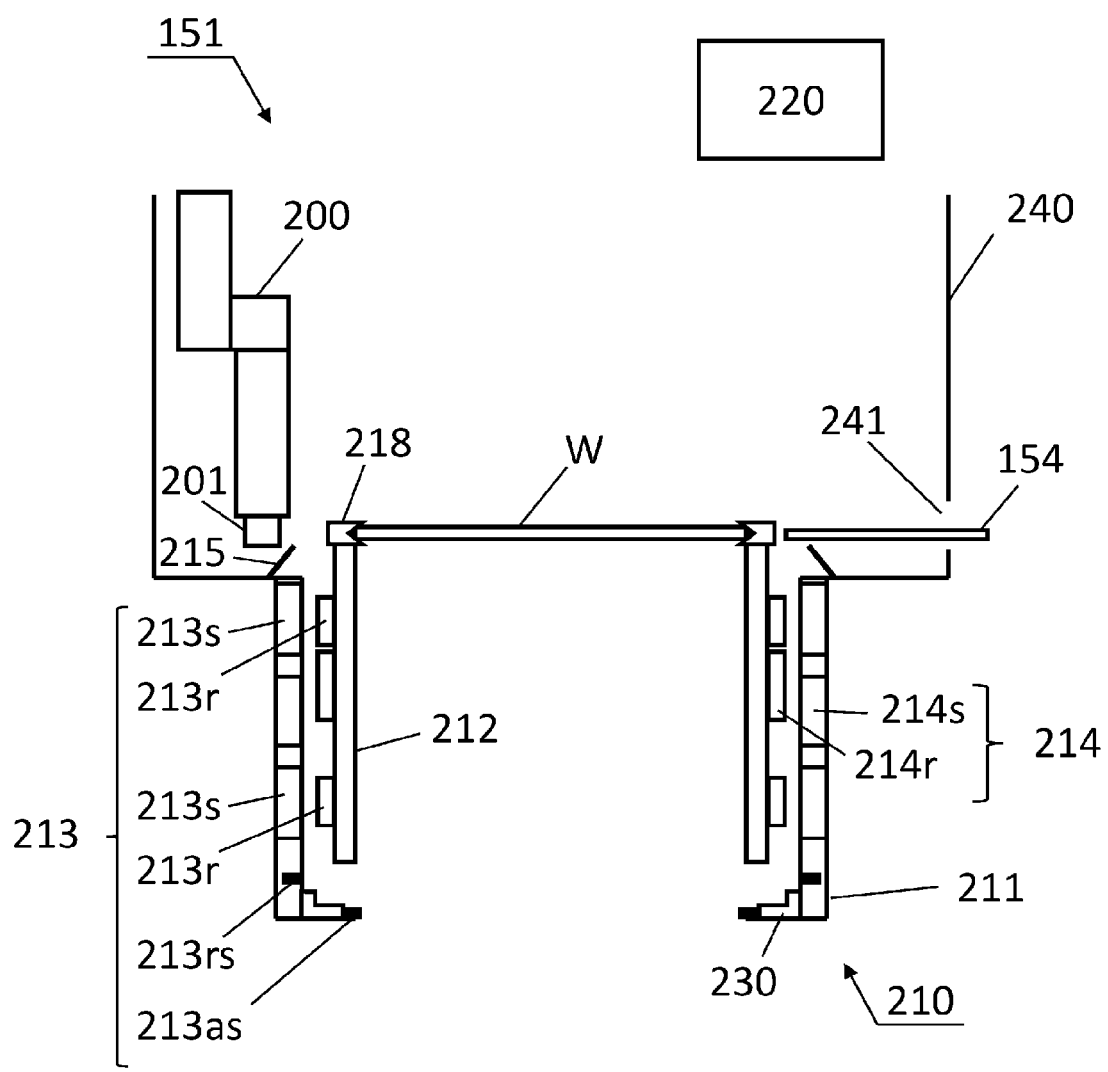
FIG. 5 is a front view schematically illustrating the substrate rotation device including the motor rotor having the length identical to that of the motor stator and the substrate cleaning device including this substrate rotation device and a view where the inner cylinder is positioned at the conveyance position.

On the other hand, the length of the motor rotor 214r may be identical to or shorter than the length of the motor stator 214s. FIG. 4 and FIG. 5 are front views schematically illustrating the substrate rotation device 210 including the motor rotor 214r having a length identical to that of the motor stator 214s. FIG. 4 illustrates a case where the inner cylinder 212 is at the cleaning position. FIG. 5 illustrates a case where the inner cylinder 212 is at the conveyance position. As seen from FIG. 4 and FIG. 5, it is preferable that the magnetic bearing 213 and the motor 214 are configured such that the motor stator 214s is opposed to the motor rotor 214r when the inner cylinder 212 is at the cleaning position. Furthermore, it is preferable that the magnetic bearing 213 and the motor 214 are configured such that the magnetic bearing stator 213s is opposed to the magnetic bearing rotor 213r when the inner cylinder 212 is at the conveyance position. Thus configuring the substrate rotation device 210 allows the motor to sufficiently act when the rotation is required most, that is, when the substrate W is cleaned. When the substrate rotation device 210 is mounted on the device other than the substrate cleaning device, a phrase "when the substrate W is cleaned" may be read as "when the substrate W is processed."

Figure 6:
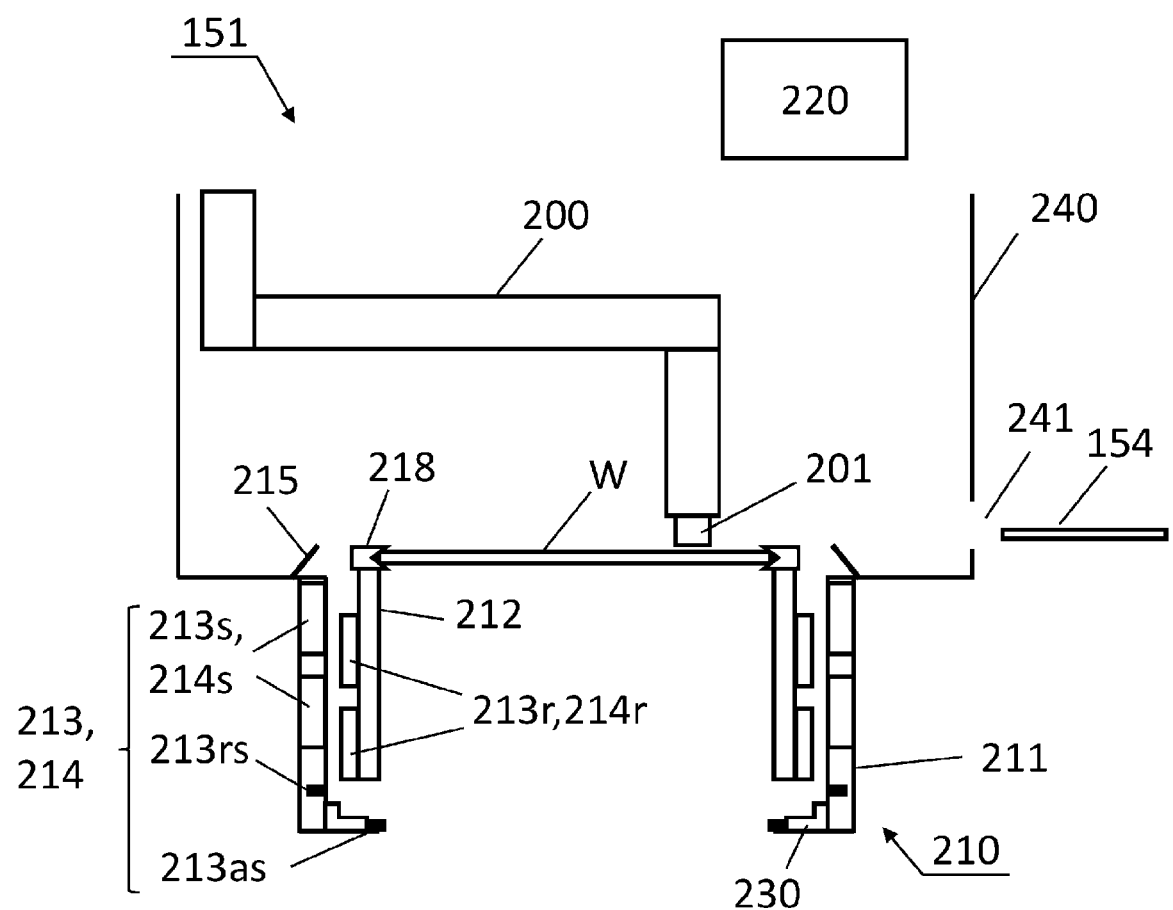
FIG. 6 is a front view schematically illustrating a substrate rotation device, where a height at which a magnetic bearing stator is positioned is identical to a height at which the motor stator is positioned and a height at which a magnetic bearing rotor is positioned is identical to a height at which the motor rotor is positioned, and a substrate cleaning device including this substrate rotation device.
Figure 7:
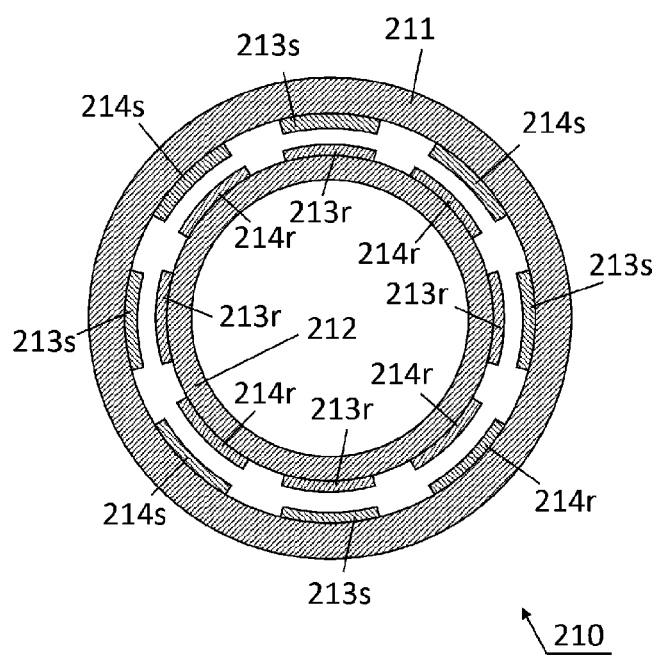
FIG. 7 is a cross-sectional view of the substrate rotation device in FIG. 6.

FIG. 2 to FIG. 5 illustrate the examples where the height at which the magnetic bearing stator 213s is positioned is different from the height at which the motor stator 214s is positioned, and the height at which the magnetic bearing rotor 213r is positioned is different from the height at which the motor rotor 214r is positioned. FIG. 6 illustrates a configuration different from those in FIG. 2 to FIG. 5. FIG. 6 is a front view schematically illustrating the substrate rotation device 210 where the height at which the magnetic bearing stator 213s is positioned is identical to the height at which the motor stator 214s is positioned, and the height at which the magnetic bearing rotor 213r is positioned is identical to the height at which the motor rotor 214r is positioned. FIG. 7 is a cross-sectional view on a horizontal surface at which the magnetic bearing stator 213s and the like are positioned, in the substrate rotation device 210 in FIG. 6.

As illustrated in FIG. 6 and FIG. 7, the magnetic bearing stator 213s and the motor stator 214s are mounted on the outer cylinder 211 at an identical height. Similarly, the magnetic bearing rotor 213r and the motor rotor 214r are mounted on the inner cylinder 212 at an identical height. Configuring the substrate rotation device 210 as in FIG. 6 and FIG. 7 can make the length in the up-down direction (axial direction) of the substrate rotation device 210 smaller than that of the substrate rotation device 210 in FIG. 2 and the like. That is, configuring the substrate rotation device 210 as in FIG. 6 and FIG. 7 ensures reduction in size of the substrate rotation device 210, thus ensuring weight reduction of the inner cylinder 212 as a result. The inner cylinder 212 lightens to ensure reduction in electric power required for the magnetic levitation and the rotation of the inner cylinder 212. Note that the layout of the respective components, the number of magnetic poles, and the like illustrated in FIG. 6 and FIG. 7 are merely schematic examples, and a specific configuration may be selected by the person skilled in the art as necessary.

Some embodiments of the present invention have been described above in order to facilitate understanding of the present invention without limiting the present invention. The present invention can be changed or improved without departing from the gist thereof, and of course, the equivalents of the present invention are included in the present invention. It is possible to arbitrarily combine or omit respective components according to claims and description in a range in which at least a part of the above-described problems can be solved, or a range in which at least a part of the effects can be exhibited.

For example, as aforementioned, the substrate rotation device 210 is applicable to the device other than the substrate cleaning device. Insofar as the device where another component inhibits the conveyance of the substrate W even if it is the device without including the splash guard or the device where the splash guard does not inhibit the conveyance of the substrate W, the device has especially an advantage in the use of the substrate rotation device 210. The substrate rotation device 210 may be applied to the substrate cleaning device including double splash guards (a rotation cup and a fixed cup) as illustrated in Japanese Unexamined Patent Application Publication No. 2018-006368. The first substrate cleaning device 151 may be configured such that both of a front surface and a back surface of the substrate are cleaned from both up and down directions as illustrated in Japanese Unexamined Patent Application Publication No. 2018-006368.

This application discloses a substrate rotation device as one embodiment. The substrate rotation device includes an outer cylinder, an inner cylinder positioned inside the outer cylinder, a motor for rotating the inner cylinder, a magnetic bearing for magnetically levitating the inner cylinder, and a substrate holder disposed on the inner cylinder. The motor is a radial motor including a motor stator mounted on the outer cylinder, and a motor rotor mounted on the inner cylinder. The magnetic bearing is a radial magnetic bearing including a magnetic bearing stator mounted on the outer cylinder, and a magnetic bearing rotor mounted on the inner cylinder. The magnetic bearing is configured to magnetically levitate the inner cylinder with an attractive force between the magnetic bearing stator and the magnetic bearing rotor.

Further, this application discloses a control method for a substrate rotation device as one embodiment. The substrate rotation device includes an outer cylinder, an inner cylinder positioned inside the outer cylinder, a motor for rotating the inner cylinder, a magnetic bearing for magnetically levitating the inner cylinder, and a substrate holder disposed on the inner pip. The motor is a radial motor including a motor stator mounted on the outer cylinder, and a motor rotor mounted on the inner cylinder. The magnetic bearing is a radial magnetic bearing including a magnetic bearing stator mounted on the outer cylinder, and a magnetic bearing rotor mounted on the inner cylinder. The method includes a step of magnetically levitating the inner cylinder with an attractive force between the magnetic bearing stator and the magnetic bearing rotor.

The above-described substrate rotation device and control method for the substrate rotation device provide an effect that allows the radial magnetic bearing to magnetically levitate the inner cylinder, that is, the radial magnetic bearing to support the inner cylinder in the axial direction as one example.

Further, this application discloses a substrate rotation device where the inner cylinder is positioned movable up and down inside the outer cylinder, the substrate rotation device includes a control unit, and the control unit is configured to control a bias current of the magnetic bearing to move the inner cylinder in an up-down direction between a first position and a second position that is a position higher than the first position as one embodiment. Further, this application discloses a control method for a substrate rotation device where the inner cylinder is positioned movable up and down inside the outer cylinder, and the method includes a step of controlling a bias current of the magnetic bearing to move the inner cylinder in an up-down direction between a first position and a second position that is a position higher than the first position as one embodiment.

The above-described substrate rotation device and control method for the substrate rotation device control the bias current of the magnetic bearing to allow the inner cylinder and eventually the substrate holder to move up and down between the cleaning position (the first position) and the conveyance position (the second position). The conveyance of the substrate is facilitated when the inner cylinder is at the conveyance position. Meanwhile, when the inner cylinder is at the cleaning position, the splash guard can receive the liquid scattered from the substrate.

Further, this application discloses a substrate rotation device where the motor rotor has a length longer than a length of the motor stator as one embodiment. Further, this application discloses a substrate rotation device where the length of the motor rotor and the length of the motor stator have a difference that is larger than a distance between the first position and the second position as one embodiment. Further, this application discloses a substrate rotation device configured such that the motor stator is opposed to the motor rotor when the inner cylinder is at the first position, and the magnetic bearing stator is opposed to the magnetic bearing rotor when the inner cylinder is at the second position as one embodiment. Further, this application discloses a substrate rotation device where a height at which the magnetic bearing stator is positioned is identical to a height at which the motor stator is positioned, and a height at which the magnetic bearing rotor is positioned is identical to a height at which the motor rotor is positioned as one embodiment. Further, this application discloses a substrate rotation device where the magnetic bearing includes an axial sensor, and the control unit performs a feedback control on the magnetic bearing based on a signal from the axial sensor as one embodiment.

The details of the substrate rotation device are made apparent from these disclosures.

Further, this application discloses a substrate cleaning device including the substrate rotation device disclosed in this application, and a cleaning arm for cleaning a substrate held by the substrate holder of the substrate rotation device as one embodiment. Further, this application discloses a substrate cleaning device that includes the substrate rotation device disclosed in this application, a cleaning arm for cleaning a substrate held by the substrate holder of the substrate rotation device, and a splash guard for receiving a liquid scattered from a substrate as one embodiment. The substrate cleaning device is configured such that the substrate holder is positioned at a height identical to an upper end of the splash guard or lower than the upper end of the splash guard when the inner cylinder is at the first position, and the substrate holder is positioned higher than the upper end of the splash guard when the inner cylinder is at the second position.

Further, this application discloses a substrate processing device including a substrate polishing unit for polishing a substrate, and a substrate cleaning unit for cleaning a substrate polished at the substrate polishing unit as one embodiment. The substrate cleaning unit includes the substrate cleaning device disclosed in this application, and a cleaning-unit conveyance robot for receiving a substrate from the substrate holder of the substrate cleaning device and delivers a substrate to the substrate holder.

The details of the substrate cleaning device and the substrate processing device are made apparent from these disclosures.

What is claimed is:

1. A substrate rotation device comprising:
   an outer cylinder;
   an inner cylinder positioned inside the outer cylinder;
   a motor for rotating the inner cylinder;
   a magnetic bearing for magnetically levitating the inner cylinder; and
   a substrate holder disposed on the inner cylinder,
   wherein the motor is a radial motor and includes:
      a motor stator mounted on the outer cylinder, and a motor rotor mounted on the inner cylinder,
the magnetic bearing is a radial magnetic bearing and includes:
- a magnetic bearing stator mounted on the outer cylinder, and
- a magnetic bearing rotor mounted on the inner cylinder, and the magnetic bearing is configured to magnetically levitate the inner cylinder with an attractive force between the magnetic bearing stator and the magnetic bearing rotor.

2. The substrate rotation device according to claim 1, wherein
the inner cylinder is positioned movable up and down inside the outer cylinder,
the substrate rotation device includes a controller, and
the controller is configured to control a bias current of the magnetic bearing to move the inner cylinder in an up-down direction between:
a first position, and
a second position that is a position higher than the first position.

3. The substrate rotation device according to claim 1, wherein
the motor rotor has a length longer than a length of the motor stator.

4. The substrate rotation device according to claim 3, wherein
the length of the motor rotor and the length of the motor stator have a difference that is larger than a distance between the first position and the second position.

5. The substrate rotation device according to claim 2, wherein
the substrate rotation device is configured such that:
the motor stator is opposed to the motor rotor when the inner cylinder is at the first position, and
the magnetic bearing stator is opposed to the magnetic bearing rotor when the inner cylinder is at the second position.

6. The substrate rotation device according to claim 1, wherein a height at which the magnetic bearing stator is positioned is identical to a height at which the motor stator is positioned, and a height at which the magnetic bearing rotor is positioned is identical to a height at which the motor rotor is positioned.

7. The substrate rotation device according to claim 1, wherein the magnetic bearing includes an axial sensor, and
a controller performs a feedback control on the magnetic bearing based on a signal from the axial sensor.

8. A substrate cleaning device comprising:
the substrate rotation device according to claim 1; and
a cleaning arm for cleaning a substrate held by the substrate holder of the substrate rotation device.

9. A substrate cleaning device comprising:
the substrate rotation device according to claim 2;
a cleaning arm for cleaning a substrate held by the substrate holder of the substrate rotation device; and
a splash guard for receiving a liquid scattered from a substrate,
wherein the substrate cleaning device is configured such that:
the substrate holder is positioned at a height identical to an upper end of the splash guard or lower than the upper end of the splash guard when the inner cylinder is at the first position, and
the substrate holder is positioned higher than the upper end of the splash guard when the inner cylinder is at the second position.

10. A substrate processing device comprising:
a substrate polishing unit including a polishing pad for polishing a substrate; and
a substrate cleaning unit for cleaning a substrate polished at the substrate polishing unit,
wherein the substrate cleaning unit includes:
the substrate cleaning device according to claim 8, and
a cleaning-unit conveyance robot for receiving a substrate from the substrate holder of the substrate cleaning device and delivering the substrate to the substrate holder.

11. A control method for a substrate rotation device, wherein the substrate rotation device includes:
an outer cylinder;
an inner cylinder positioned inside the outer cylinder;
a motor for rotating the inner cylinder;
a magnetic bearing for magnetically levitating the inner cylinder; and
a substrate holder disposed on the inner cylinder,
wherein the motor is a radial motor and includes:
a motor stator mounted on the outer cylinder, and
a motor rotor mounted on the inner cylinder,
the magnetic bearing is a radial magnetic bearing and includes:
a magnetic bearing stator mounted on the outer cylinder, and
a magnetic bearing rotor mounted on the inner cylinder, and
wherein the method comprises magnetically levitating the inner cylinder with an attractive force between the magnetic bearing stator and the magnetic bearing rotor.

12. The control method for the substrate rotation device according to claim 11,
wherein the inner cylinder is positioned movable up and down inside the outer cylinder, and
the method comprises controlling a bias current of the magnetic bearing to move the inner cylinder in an up-down direction between:
a first position, and
a second position that is a position higher than the first position.

* * * * *